US006256732B1

(12) United States Patent
Cromer et al.

(10) Patent No.: US 6,256,732 B1
(45) Date of Patent: *Jul. 3, 2001

(54) COMPUTER SYSTEM HAVING AUTOMATIC REGISTRATION FOR IN-BOX CONFIGURATION

(75) Inventors: Daryl Carvis Cromer, Cary; Brandon J. Ellison, Raleigh; Christopher Brit Gould, Raleigh; Gregory William Kilmer, Raleigh; David Rhoades, Apex; James Peter Ward, Raleigh, all of NC (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/103,684

(22) Filed: Jun. 25, 1998

(51) Int. Cl.[7] .................................................. G06F 9/00
(52) U.S. Cl. ...................................................... 713/2; 53/428
(58) Field of Search ............................. 713/2, 1; 53/428, 53/396

(56) References Cited

U.S. PATENT DOCUMENTS

| 4,623,963 | * | 11/1986 | Phillips | 364/300 |
| 5,406,261 | * | 4/1995 | Glenn | 340/571 |
| 5,781,723 | * | 7/1998 | Yee et al. | 395/186 |
| 5,790,888 | * | 8/1998 | Dreyer et al. | 395/825 |
| 5,927,050 | * | 7/1999 | Houck et al. | 53/428 |
| 5,945,915 | * | 8/1999 | Cromer et al. | 340/686.1 |
| 6,151,606 | * | 11/2000 | Mendez | 707/201 |

* cited by examiner

Primary Examiner—Robert Beausoleil
Assistant Examiner—Rita Ziemer
(74) Attorney, Agent, or Firm—J Bruce Schelkopf

(57) ABSTRACT

Described is a computer system which can automatically provide its capabilities to a main computer without powering on to facilitate configuring the system in its shipping package. The computer system is coupled to a remote computer via a data communication link. The system includes a communication subsystem which is supplied with auxiliary power and is operative to detect when a valid communication link is established between the computer system and the main computer. After the detection the communication subsystem sends a first packet to the main computer via the communication subsystem. The first packet includes data which specifically identifies the computer system. When the communication link is coupled to the communication subsystem through the packaging and a power source is coupled to a power connector of the system through the packaging, the system is operative to send the first packet without powering on.

15 Claims, 8 Drawing Sheets

COMPUTER SYSTEM HAVING AUTOMATIC REGISTRATION FOR IN-BOX CONFIGURATION

RELATED APPLICATIONS

The present invention is believed to be related to the following pending applications:

Application Ser. No. 08/972,462, filed Nov. 14, 1997, and entitled "IN-BOX CONFIGURATION METHOD FOR A COMPUTER SYSTEM"; and Application Ser. No. 09/104,835, filed Jun. 25, 1998, and entitled "COMPUTER SYSTEM HAVING AUTOMATIC POWER ON AND INITIALIZATION FOR IN-BOX CONFIGURATION"; and Application Ser. No. 09/024,231, filed Feb. 17, 1998, and entitled "FULL TIME NETWORK AUXILIARY FOR A NETWORK CONNECTED PC".

BACKGROUND OF THE INVENTION

1. Field of the Invention

The present invention relates to computer systems coupled to a network and more particularly to a system which can transmit identification information across a connection to a network and allow a convenient method for configuring the computer system to load customized programs and BIOS in particular.

2. Description of Related Art

Personal computer systems are well known in the art. Personal computer systems have attained widespread use for providing computer power to many segments of today's modern society. Personal computers can typically be defined as a desktop, floor standing, or portable microcomputer that is comprised of a system unit having a single central processing unit (CPU) and associated volatile and non-volatile memory, including random access memory (RAM) and basic input output system read only memory (BIOS ROM), a system monitor, a keyboard, one or more flexible diskette drives, a CD-ROM drive, a fixed disk storage drive (also known as a "hard drive"), a so-called "mouse" pointing device, and an optional network interface adapter. One of the distinguishing characteristics of these systems is the use of a motherboard or system planar to electrically connect these components together. Examples of such personal computer systems are IBM's PC 300 series and IBM's Aptiva Series.

It is normal to custom configure the system unit of a computer system for a user at a dealer, a corporate configuration center, or at the user site. When done at the dealer or at a configuration center the resources and skills needed are available but the computer must be removed from the packaging, set up, configured with BIOS and a program image and then repackaged to be sent to the end user. Alternatively, the configuration may be done at the manufacturer, prior to packaging, but it is difficult to provide the degree of customization usually desired without major inventory problems and the customization tends to get "stale" (out of date) with the time and may need to be redone. There may even be royalty expense waste with systems that go stale before they are deployed.

At the user site, roll out of generic systems is a less efficient use of resources but avoids the repackaging problem. For complex program images and system resource add-ons, it may be necessary to send out a skilled configuration expert thus consuming valuable skills with travel time to the user site. The "house call" leaves the expert without the full complement of diagnostic equipment and programs typically available at a configuration center.

Accordingly, a number of methods have been developed for simplifying the configuration of computer systems. For example, U.S. patent application Ser. No. 08/972,462, filed Nov. 14, 1997 for "IN-BOX CONFIGURATION METHOD FOR A COMPUTER SYSTEM" by Houck et al., owned by the assignee of the present invention and incorporated herein by reference, discloses a method and system that is adapted to allow configuration to occur on the system unit without removing the system unit from its packaging. The technician need only manually obtain the Media Access Controller (MAC) address and the type of device driver for the system, connect an Ethernet cable and connect the power cord. The system is then turned on via Wake On LAN (WOL) and connects to the server which downloads the appropriate images. By so preparing and operating the unit so that it can function to a degree as a network client, it is possible to perform set up or configuration "in the package" that violates normal operation of the system. However, there are situations where it would be advantageous to provide the MAC address and device driver type electronically and automatically to eliminate the technician's need to know this information for custom configuration of a system unit in its packaging.

It is therefore desirable to provide a scheme for when a computer system is in a configuration or maintenance environment to change the normal operation of the computer system such that the system automatically transmits information relating to its identification and capabilities across a network to a main computer to allow for automatic registration to simplify the configuration process.

SUMMARY OF THE INVENTION

The present invention is directed to a computer system which can automatically provide its capabilities to a main computer without powering on to facilitate configuring the system in its shipping package. The computer system is supplied with auxiliary power and is operative to provide its capabilities regardless of whether the system is at a manufacturing site, configuration center, or user center.

The computer system of the present invention is coupled to a main computer via a data communication link. The system includes a communication subsystem for communicating data with the computer system. The communication subsystem is supplied with auxiliary power and is operative to communicate with the computer system regardless of whether the computer system is in a normal operating state. The communication subsystem is operative to generate a link signal in a first state when a valid communication link is established with the main computer and the subsystem is operative to change the link signal from the first state to a second state when the data communication link is disconnected.

The computer system further includes a logic circuit coupled to the communication subsystem. The logic circuit is supplied with auxiliary power and is operative to send a first packet to the main computer via the communication subsystem when the link signal is in a first state. The first packet includes data which specifically identifies the computer system. When the communication link is coupled to the communication subsystem through the packaging and a power source is coupled to a power connector of the system through the packaging, the system is operative to send the first packet without powering on.

DETAILED DESCRIPTION OF THE INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention. This application is written for those very familiar with all aspects of computer system design.

Figure 2:
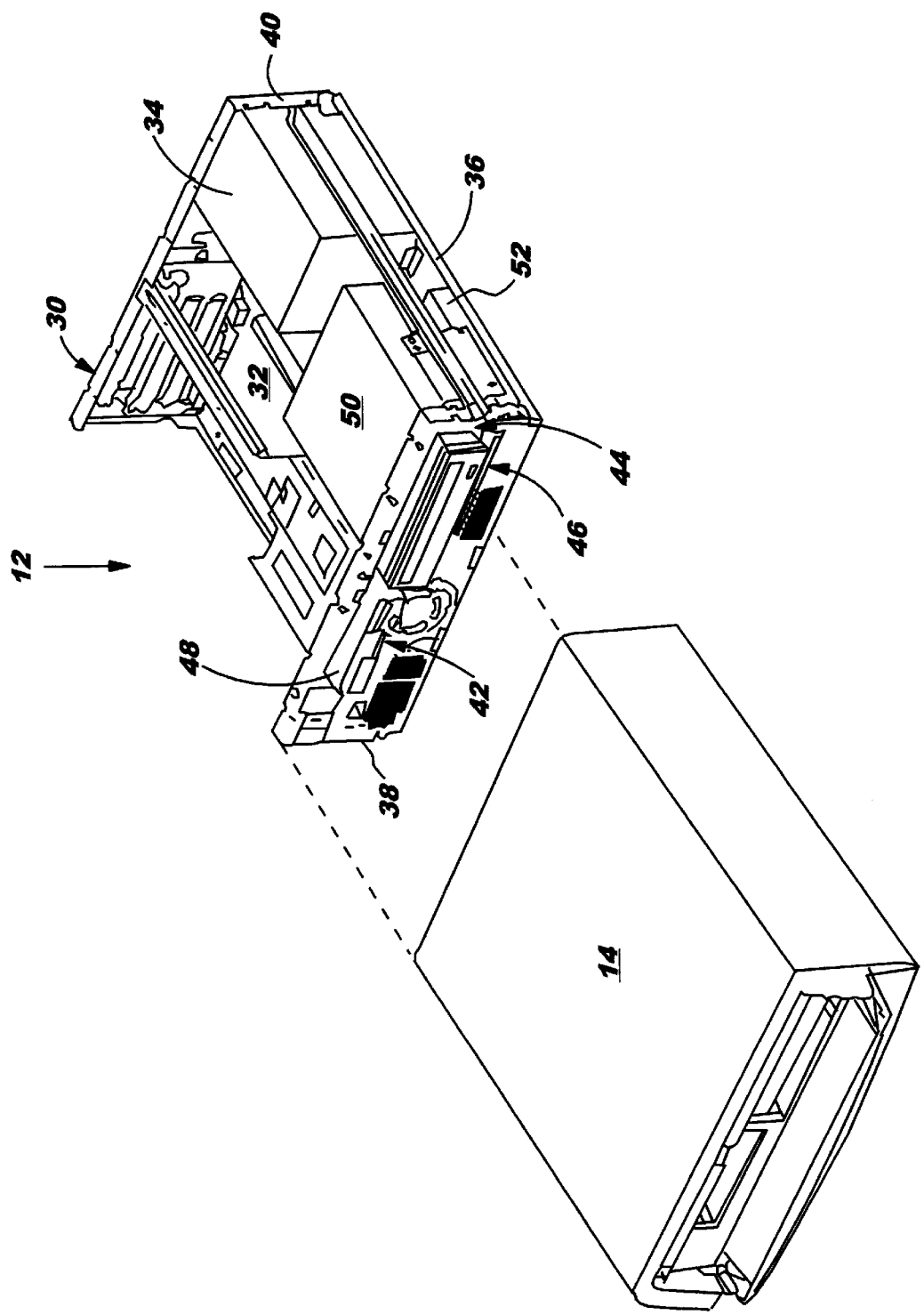
FIG. 2 is an exploded perspective view of certain elements of the personal computer including a chassis, a cover, an electromechanical direct access storage device and a planar board and illustrating certain relationships among those elements.

Referring now more particularly to the accompanying drawings, a shipping package or carton 10 of cardboard, preferably is sized to enclose a computer apparatus 12 having a computer housing 14. The computer housing 14 encloses a computer system (discussed below respect to FIG. 2) and has mounted thereto, to be externally accessible, a power connector 16, a network connector 18, a display connector 20, a keyboard connector 22, a mouse port 24 and a power switch 26. A section 28 of the package 10 is preferably identified adjacent to the power connector 16 and the network connector 18 to facilitate access thereto and may be identified by a slit to define a flap or by dashed lines to indicate a cutaway area. It is preferred to arrange the network connector 18 to be near the power connector 16 so that only a small opening 28 is needed.

The computer 12 has a cover 14 which is a decorative outer member (FIG. 2) which cooperates with a chassis 30 in defining an enclosed, shielded volume for receiving electrically powered data processing and storage components for processing and storing digital data. At least certain of these components are mounted on a multi layer planar 32 or motherboard which is mounted on the chassis 30 and provides a means for electrically interconnecting the components of the computer 12 including those identified above and such other associated elements as floppy disk drives, various forms of direct access storage devices, accessory adapter cards or boards, and the like. As pointed out more fully hereinafter, provisions are made in the planar 32 for the passage of input/output signals to and from the operating components of the microcomputer.

Figure 1:
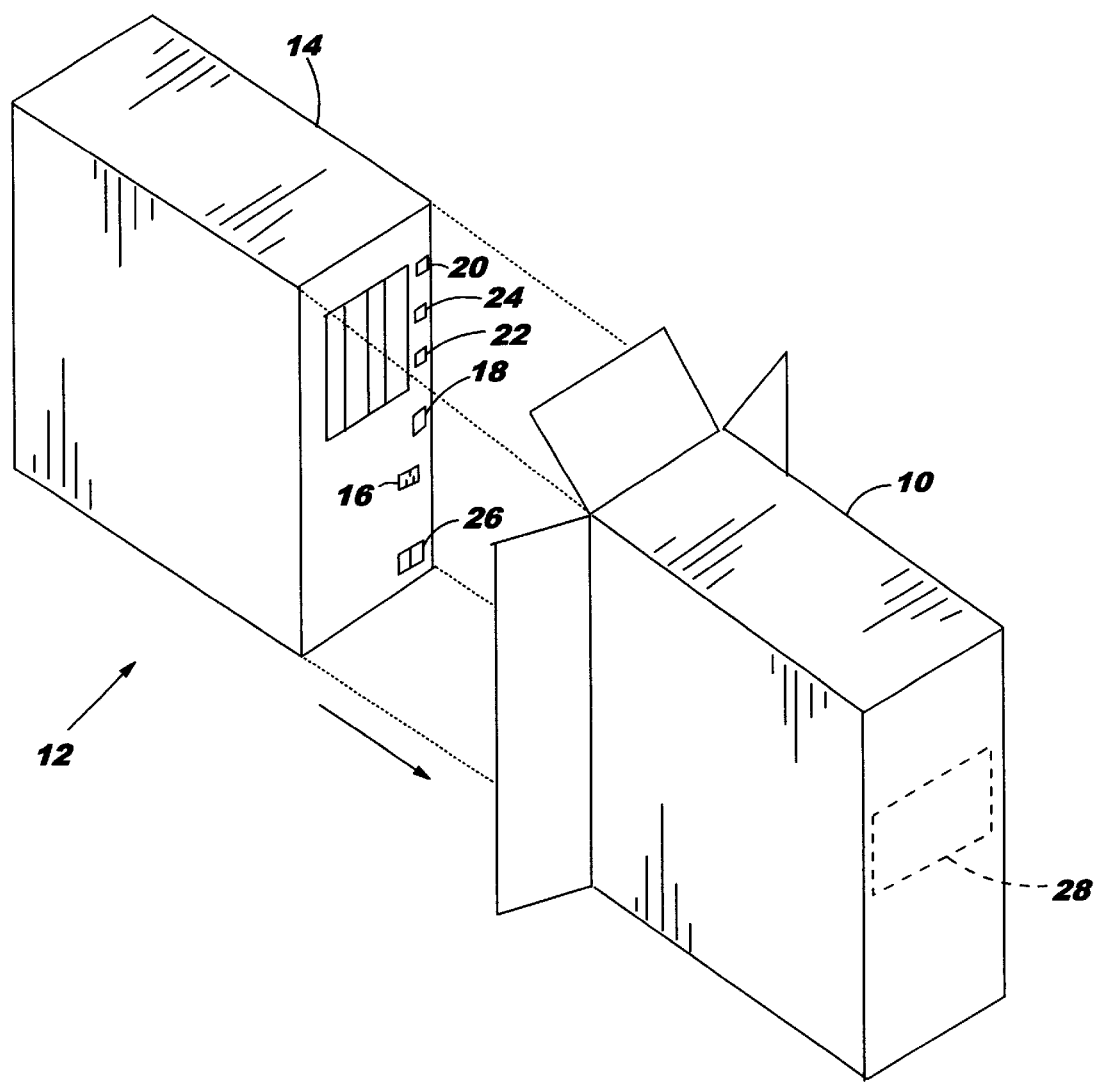
FIG. 1 is a pictorial illustration of a shipping package for a computer system unit that supports in-box configuration along with a computer system according to this invention.

The system 12 has a power supply 34, a power switch 26 shown in FIG. 1. The chassis 30 has a base indicated at 36, a front panel indicated at 38, and a rear panel indicated at 40. The front panel 38 defines at least one open bay (and in the form illustrated, three bays) for receiving a data storage device such as a disk drive for magnetic or optical disks, a tape backup drive, or the like. In the illustrated form, a pair of upper bays 42, 44 and a lower bay 46 are provided. One of the upper bays 42 is adapted to receive peripheral drives of a first size (such as those known as 3.5 inch drives) while the other 44 is adapted to receive drives of a different size (such as a CD ROM drive) and the lower bay is adapted to receive another drive. One floppy disk drive is indicated at 48 is a removable medium direct access storage device (DASD) capable of receiving a diskette inserted there into and using the diskette to receive, store and deliver data as is generally known. One CD ROM drive is indicated at 50 is a removable medium direct access storage device capable of receiving a compact disc inserted there into and using the disc to deliver data as is generally known. One hard disk drive is indicated at 52 and is a fixed medium direct access storage device capable of storing and delivering data as is generally known.

Figure 3:
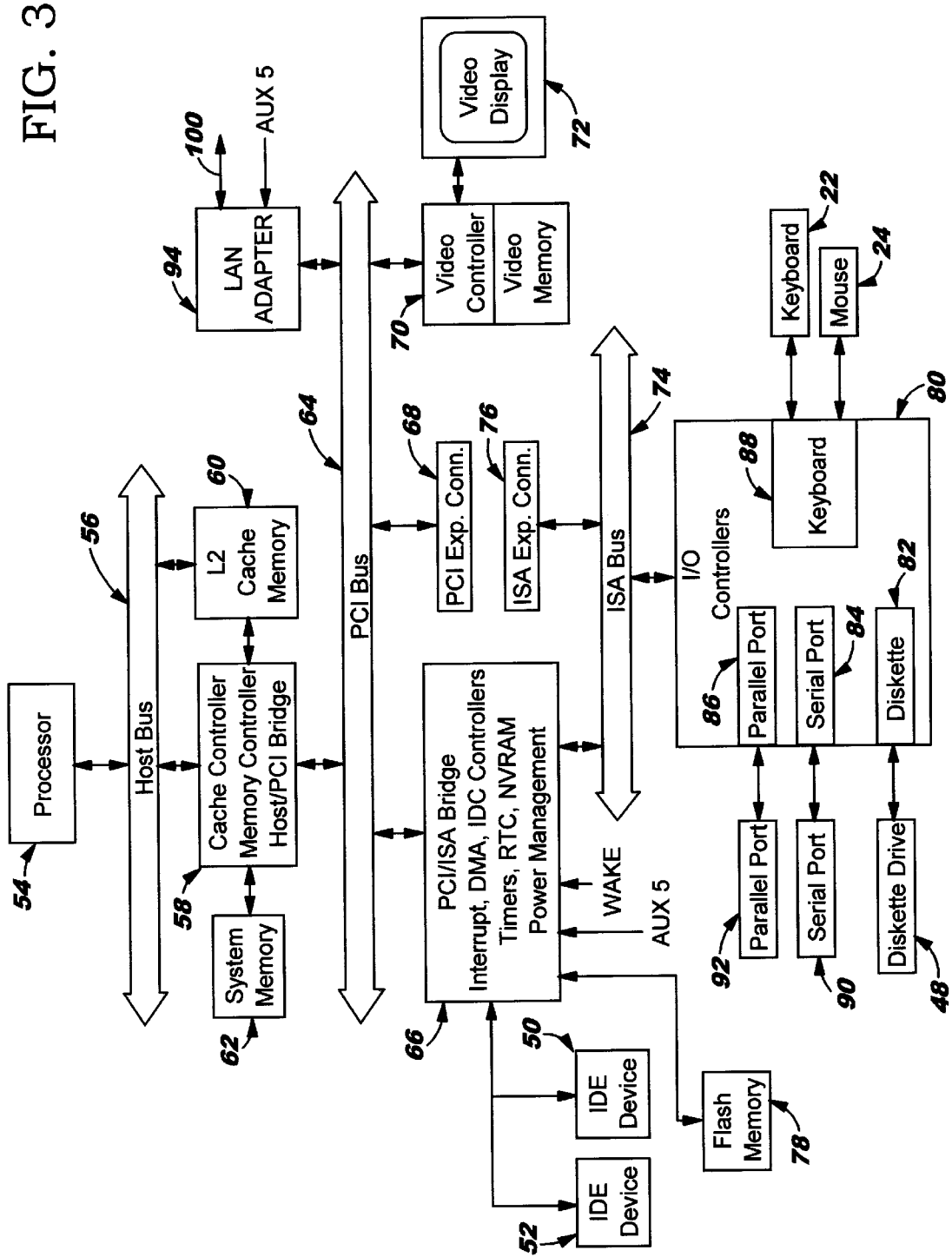
FIG. 3 shows a block diagram of certain components of the personal computer FIG. 2.

Prior to relating the above structure to the present invention, a summary of the operation in general of the personal computer system 12 may merit review. Referring to FIG. 3, there is shown a block diagram of a personal computer system illustrating the various components of the computer system such as the system 12 in accordance with the present invention, including components mounted on the planar 32 and the connection of the planar 32 to the 10 expansion connectors and other hardware of the personal computer system. Connected to the planar 32 is the system CPU or processor 54 which is connected directly to a high speed host bus 56. A first system core logic chipset 58 and L2 cache memory 60 are also connected to the host bus 56. The first core logic chipset 58 includes a memory control unit, a L2 cache controller and a peripheral component interconnect (PCI) bridge. The memory control unit is further connected to a volatile random access memory (RAM) 62. The RAM memory 62 is composed of one or more memory modules. The memory controller includes the logic for mapping addresses to and from the microprocessor 54 to particular areas of RAM 62. The cache controller is operatively coupled to the L2 cache memory 60.

The first core chipset 58 can be, for example, a Triton VX chip which is sold by Intel Corporation. The PCI bridge within chipset 58 provides an interface between the host bus 56 and a PCI bus 64. Connected to the PCI bus 64 is a second core chipset 66 and a plurality of PCI expansion connectors 68 for receiving PCI bus compatible peripheral cards. One such peripheral card is a video controller 70. The video controller 70 includes video memory and is coupled to the monitor or video display terminal 72. The chipset 66 can be, for example, an PIIX4 chip which is also sold by Intel Corporation.

The chipset 66 contains a bus control and timing unit, a plurality of timers, an interrupt controller, a direct access memory (DMA) unit, nonvolatile CMOS RAM, also herein referred to as NVRAM, a CMOS real-time clock (RTC), Flash memory interface, a PCI/ISA bridge, an integrated drive electronics (IDE) controller, and power management circuitry. The PCI/ISA bridge provides an interface between the PCI bus 64 and an optional feature or expansion bus such as the Industry Standard Architecture (ISA) bus 74. Connected to the ISA bus 74 are a plurality of ISA expansion connectors 76 for receiving ISA adapter cards (not shown). ISA adapter cards can be pluggably connected to the ISA expansion connectors 76 and may provide additional 10 devices or memory for the system 12.

Attached to the 66 is a flash memory (FM) module or chip 78. Flash memory module 78 contains microcode that system 12 will execute on power on. The flash memory 78 is an electrically erasable programmable read only memory (EEPROM) module or chip and includes the BIOS that is used to interface between the 10 devices and the operating system. BIOS stored in memory 78 can be copied into RAM 62 to decrease the execution time of BIOS.

The IDE controller provides for the attachment of IDE compatible storage devices such as the fixed disk drive 52 and CD-ROM drive 50.

The real-time clock is used for time of day calculations and the NVRAM is used to store system configuration data. That is, the NVRAM will contain values which describe the present configuration of the system 12. For example, NVRAM 66 contains information describing the type of fixed disk or diskette, the list of IPL devices set by a user and the sequence to be used for a particular power on method, the type of display, the amount of memory, time, date, etc. Furthermore, these data are stored in NVRAM whenever a special configuration program, such as configuration/setup, is executed. The purpose of the configuration/setup program is to store values characterizing the configuration of the system to NVRAM.

Power management logic 66 is for changing the system 12 between various power states (e.g., off, suspend and normal operating states). The circuitry is supplied with auxiliary power (AUX) from the power supply 34 when the system 12 is in the off state so that it can monitor events which cause the system 12 to turn on. For example, the circuitry 66 also includes a timer which is configurable by a user to expire after a predetermined period of time. When the timer expires, the circuitry 66 will cause the system 12 to change from the off state to the normal operating state.

Coupled to the ISA bus 74 is a multi-function IO controller 80 such as, for example, a National Semiconductor PC87307. The IO controller 80 contains a variety of IO adapters and other components such as the diskette adapter 82, serial adapter 84, a parallel adapter 86 and keyboard controller 88. The diskette adapter 82 provides the interface to the diskette drive 48. The serial adapter 84 has an external port connector 90 for attachment of external devices such as modems (not shown). The parallel adapter 86 has an external port connector 92 for attachment of external devices such as printers (not shown). The keyboard controller 88 is the interface for the keyboard connector 22 and the mouse connector 24.

A communication subsystem 94 can be coupled to either the PCI bus 64 or ISA bus 74 for allowing system 12 to communicate (i.e., transmit/receive data) with a remote computer or server 102 (FIG. 4) over a local area network (LAN) via a connection or link 100. The communication subsystem 94 can be, for example, a LAN adapter or a LAN connection embedded on the planar 32. The subsystem 94 will be described in more detail below.

While the present invention is described hereinafter with particular reference to the system block diagram of FIG. 3, it is to be understood at the outset of the description which follows that it is contemplated that the apparatus and methods in accordance with the present invention may be used with other hardware configurations of the planar board. For example, the system processor 54 could be an Intel Pentium processor, Cyrix 586-P75 processor or Advanced Micro Devices 8486 processor or any other suitable microprocessor.

The microcomputer system 12 is shown with 16 megabytes of system memory 62. It is understood that additional memory can be interconnected as represented in FIG. 3 by installing additional or higher-density memory modules. For purposes of illustration only, the present invention is described with reference to the 16 megabytes memory configuration.

Figure 4:
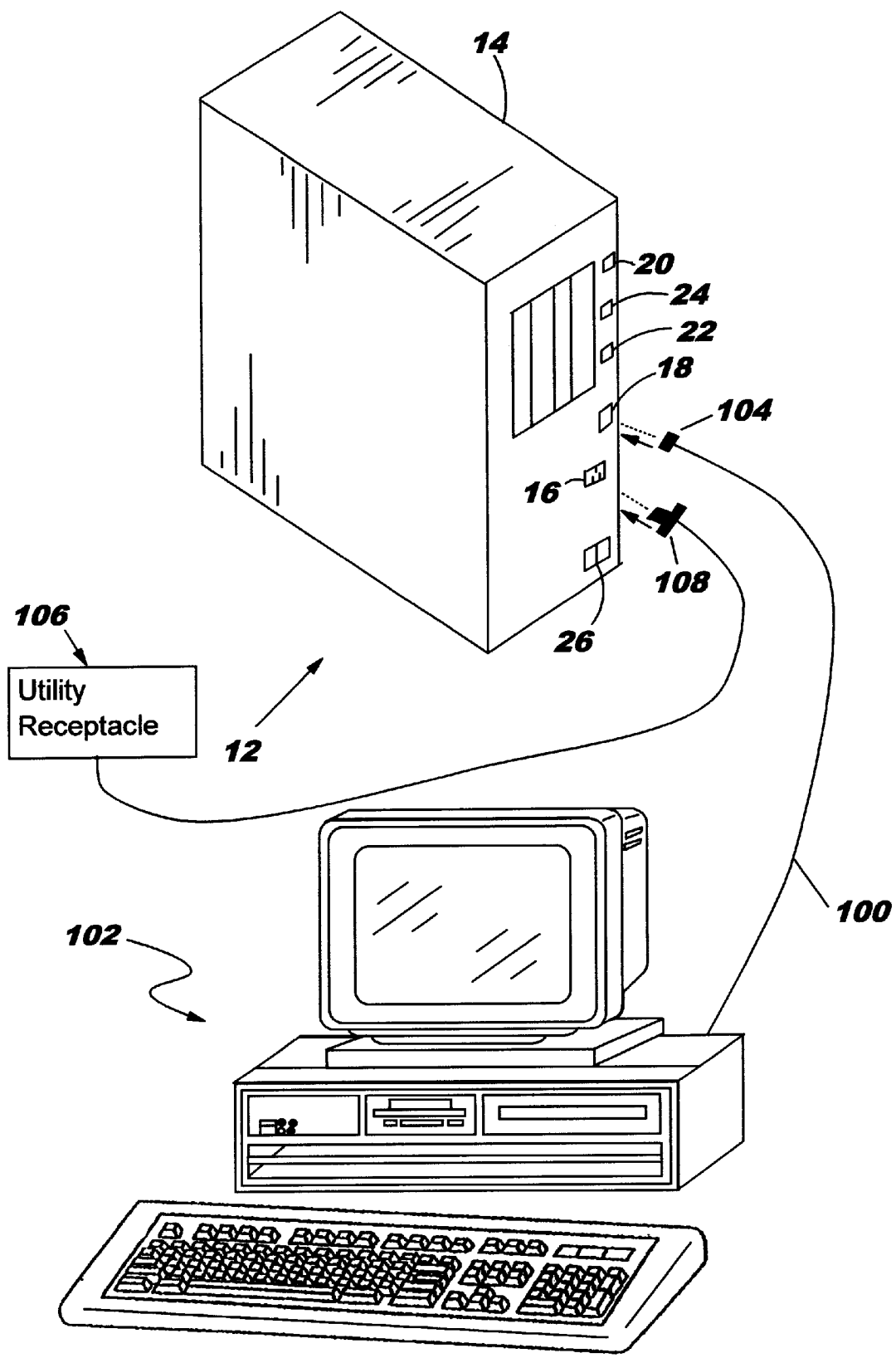
FIG. 4 is a perspective view of a personal computer embodying this invention and a LAN station remote computer system.

Referring to FIG. 4, there is a computer system embodying the present invention is there shown and generally indicated at 12 (FIG. 1). As mentioned herein above, the computer 12 may have an associated power connector 16, network connector 18, and network cable 100. There is shown the local computer system 12 along with a perspective view of a remote main computer 102. While not here shown or described in detail, the remote computer system 102 has components and attributes like those illustrated and described with regard to FIG. 3 and those additional elements appropriate to provide the nonvolatile storage mentioned, as is known to the person skilled in the appropriate arts. The main computer system 102 can be, for example, a client, a personal computer or a server. A storage means associated with the remote computer 102 can be a non-volatile means such as a direct access storage device (DASD) in the form of a hard disk device, diskette, compact disc or the like.

The local and remote main computers 12, 102 are associated one with the other through some form of local area network (LAN) or the like, in which effective communication may be established through electrically conductive connections, through fiber optical links, through infrared or other radiation links, or in other manners. Such a link is indicated in FIG. 4 at 100. The network may be a token-ring network or an Ethernet network, or other known type of network. Each of the computers may be a "personal computer" as defined herein. Alternatively, the remote computer 102 may be some computer having capabilities other than those ascribed herein to a "personal computer", and possibly beyond those capabilities.

While the term "remote" is used with reference to the computer system 102 through which the LAN station local computer system 12 accesses BIOS, that term is used in the sense of indicating separation, rather than in the sense of indicating a large physical distance between the systems. In fact, such system may be physically adjacent in some network arrangements.

One embodiment of the present invention will now be described while referring to FIG. S. The LAN subsystem 94 includes a Media Access Controller (MAC) 96. The MAC 96 serves as an interface between a shared data path (e.g., media independent interface (described below) and the PCI bus 64 (or ISA bus 74 if subsystem 94 were connected to the ISA bus 74). The MAC 96 performs a number of functions involved in the transmission and reception of data packets. For example, during the transmission of data, the MAC 96 assembles the data to be transmitted into a packet with address and error detection fields. Conversely, during the reception of a packet, the MAC 96 disassembles the packet and performs address checking and error detection. In addition, the MAC 96 typically performs encoding/decoding of digital signals transmitted over the shared path and performs preamble generation/removal as well as bit transmission/reception. The MAC 96 can be for example, an Intel 82557 chip.

The LAN subsystem 94 further includes a media independent interface (MII) which is a local bus between the MAC 96 and a physical layer 98. The MII bus 97 is a specification of signals and protocols which formalizes the interfacing of a 10/100 Mbps Ethernet Media Access Controller 96 to the underlying physical layer 98.

The physical layer 98 can be a fully integrated device supporting 10 and 100 Mb/s CSMA/CD Ethernet applications. The physical layer 98 receives parallel data from the Mil local bus 97 and converts it to serial data for transmission through connector 18 and then over cable 100. The physical layer 98 is also responsible for wave shaping and provides analog voltages to cable 100. The physical layer 98 includes auto-negotiation logic that has three main purposes. First, to determine the communication capabilities (i.e., full or half duplex, 10 or 100 Mb/s speed) of the main computer 102. Second, to advertise its own communication capabilities to the main computer 102. And third, to establish a connection with the main computer 102 using the highest performance common connection technology. The physical layer 98 can be for example, an Integrated Services Systems 1890 chip.

The physical layer 98 also provides a LINK status signal 110 that reflects the current link status. The output of the LINK signal 110 is low when a valid link exists between system 12 and main computer 102. Since auxiliary voltage 107 (AUX) is provided to the subsystem 94 to support Wake On LAN (WOL), the link remains in tack when the system 12 is powered off. As long as the physical connection between the system 12 and the main computer 102 is in place, the LINK signal 110 will remain low. If the link is broken or a valid link does not exist, then the output of the LINK signal 110 will go high. The link may not be present, for example, prior to cable 100 being connected to network connector 18 of system 12.

The LAN subsystem 94 further includes network connector 95 which is the physical interface between the subsystem 94 and cable 100. The network connector 95 can be, for example, an RJ45 type connector or other form factor.

Referring to FIG. 4, a main computer 102 has a storage device such as a hard drive which contains configuration and application data for installation on customer systems. The main computer 102 is connected to a Local Area Network (LAN) 100 that has a connector 104 that connects to port 18 on system 12 to transfer boot data and configuration data to systems such as system 12. It should be appreciate that any connecting device would suffice so long as the connector devices are able to transfer data according to the network protocol. Hence infra-red or radio coupling devices may serve as the connectors 18 and 22. A utility receptacle 106 is provided with a connector 108 that is compatible to attach to the power connector 16 of system 12.

The present invention is directed to a computer system 12 which, when connected to a utility receptacle 106 and main computer 102, is operative to automatically transmit identification and capability information to a network administrator to facilitate configuring the system 12 in its shipping package 10. The present invention recognizes that by designing automatic transmission of identification and capabilities of the computer 12 it is possible to reconfigure a generic system unit in its packaging to provide customization for a respective user. This selective reconfiguration may be performed at a configuration center where a full compliment of support and configuration alternatives are available while avoiding the time and danger of system injury that is present when customer configuration is performed with a full system unpack, setup, configure, breakdown and repackaging followed by shipping to the user site.

The present invention involves the recognition that a system normally protects itself from being operated as would be required to configure in the packaging but it is desirable to override these protections and have the computer 12 automatically transmit its capabilities to a main computer 102. Conventional protections include (1) a computer system without a connected keyboard/mouse will automatically enter a setup mode, (2) a computer system conventionally remains off until turned on by the power switch, and (3) a system without display device capabilities usually allows for automatic setup by advertising monitor capabilities to BIOS and if no monitor is connected, BIOS will automatically enter a set up mode.

Figure 5:
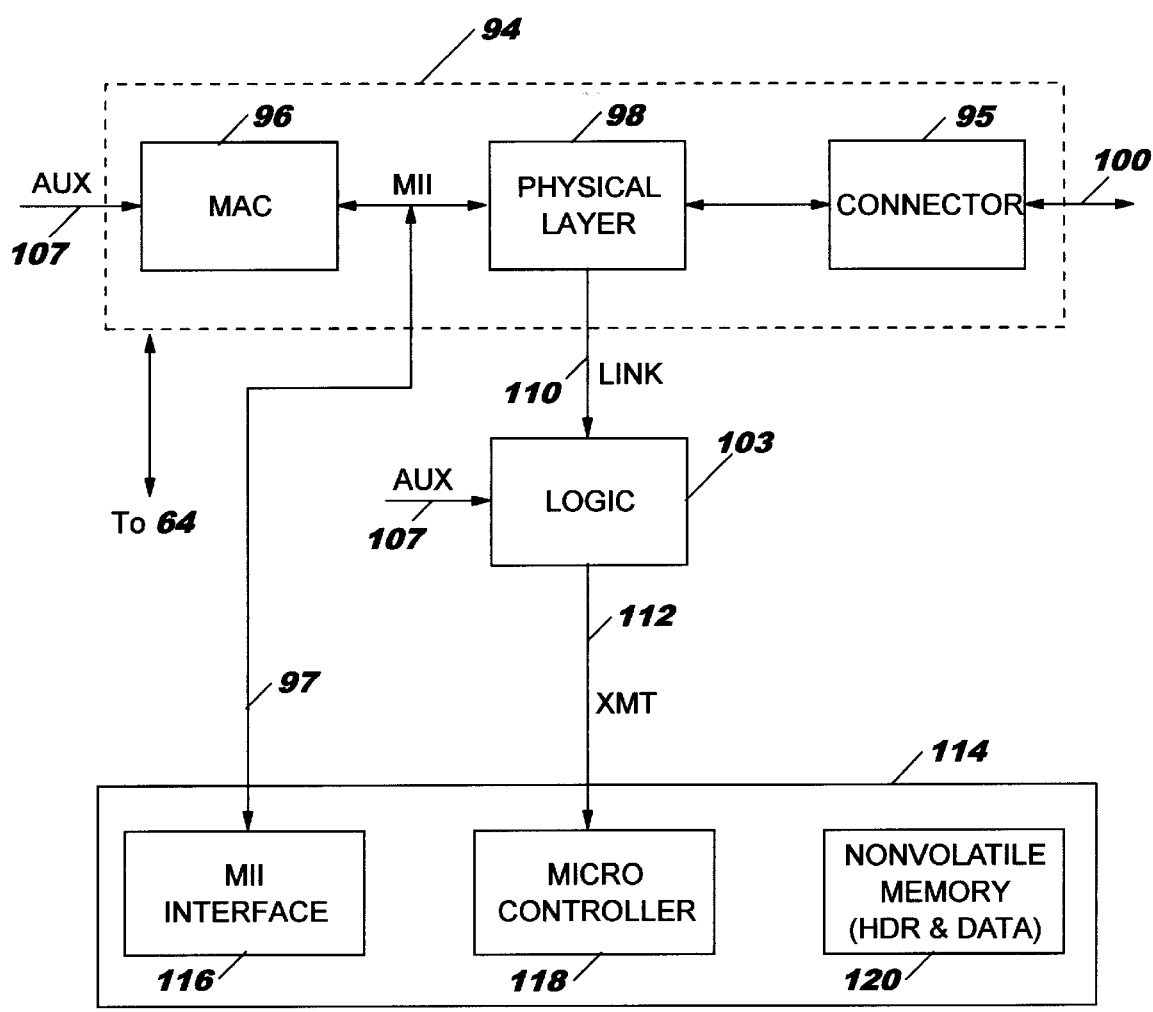
FIG. 5 is a detailed block diagram of certain components of the personal computer of FIG. 3 in accordance with the present invention.

Referring to FIG. 5, LAN subsystem 94 and logic 103 are powered by AUX 107 from power supply 34. AUX 107 is present whenever the system 12 is connected to a utility receptacle 106 by connector 108. The LAN subsystem 94 provides a LINK signal 110 to logic 103 when a valid connection is in place between system 12 and main computer 102. When the AUX signal 107 from the power supply 34 is a logic "1" state (i.e., auxiliary power is being supplied) and the LINK signal 110 is logic "0", which indicates a valid link, logic 103 will drive the XMT signal 112 to a logic "1" state. The XMT signal is supplied to logic module or ASIC 114 which is connected to the MII bus 97 that extends between the physical layer 98 and the MAC 96. By so connecting the logic 114 to the MII bus 97, it can send network packets using the physical layer 98.

If a valid link does not exist between system 12 and main computer 102 (e.g., network cable 100 is not connected), the LINK signal 110 will be at logic "1" which indicates invalid or no link, and logic 103 will not drive the XMT signal to a logic "1" state and no information will be sent.

The logic 114 according to the invention is operative to accept a command to transmit a packet of information (e.g., identification and capabilities of system 12) from computer system 12 to main computer 102 from a source such as logic 103 using the XMT signal 112. More specifically, when the ASIC 114 detects a logic "1" state XMT signal 112 it then transmits the capabilities of computer system 12 to main computer 102 using physical layer 98 of LAN subsystem 94.

Referring to FIG. 5, the logic 114 is comprised of several functional areas. The MII interface 116 is responsible for providing the signals and protocol to transfer data over the MII bus 97 to the physical layer 98. The Microcontroller 118 assembles the data in accordance with FIG. 7. The non-volatile memory is used to store the data that identifies and provides capabilities of computer system 12. The logic 114 may be a "hard wired" ASIC or a programmed general-purpose processor programmed as described below.

The logic 114 is shown as connecting to LAN subsystem 94 via the MII bus 97. It is understood that logic 114 could be connected to LAN subsystem 94 through a side-band bus such as the System Management Bus or a proprietary bus. The LAN subsystem 94 could contain logic 114 (and 103) internal to the MAC without requiring external logic. For purposes of illustration only, the present invention is described with reference to the logic connected via the MII bus.

Figure 6:
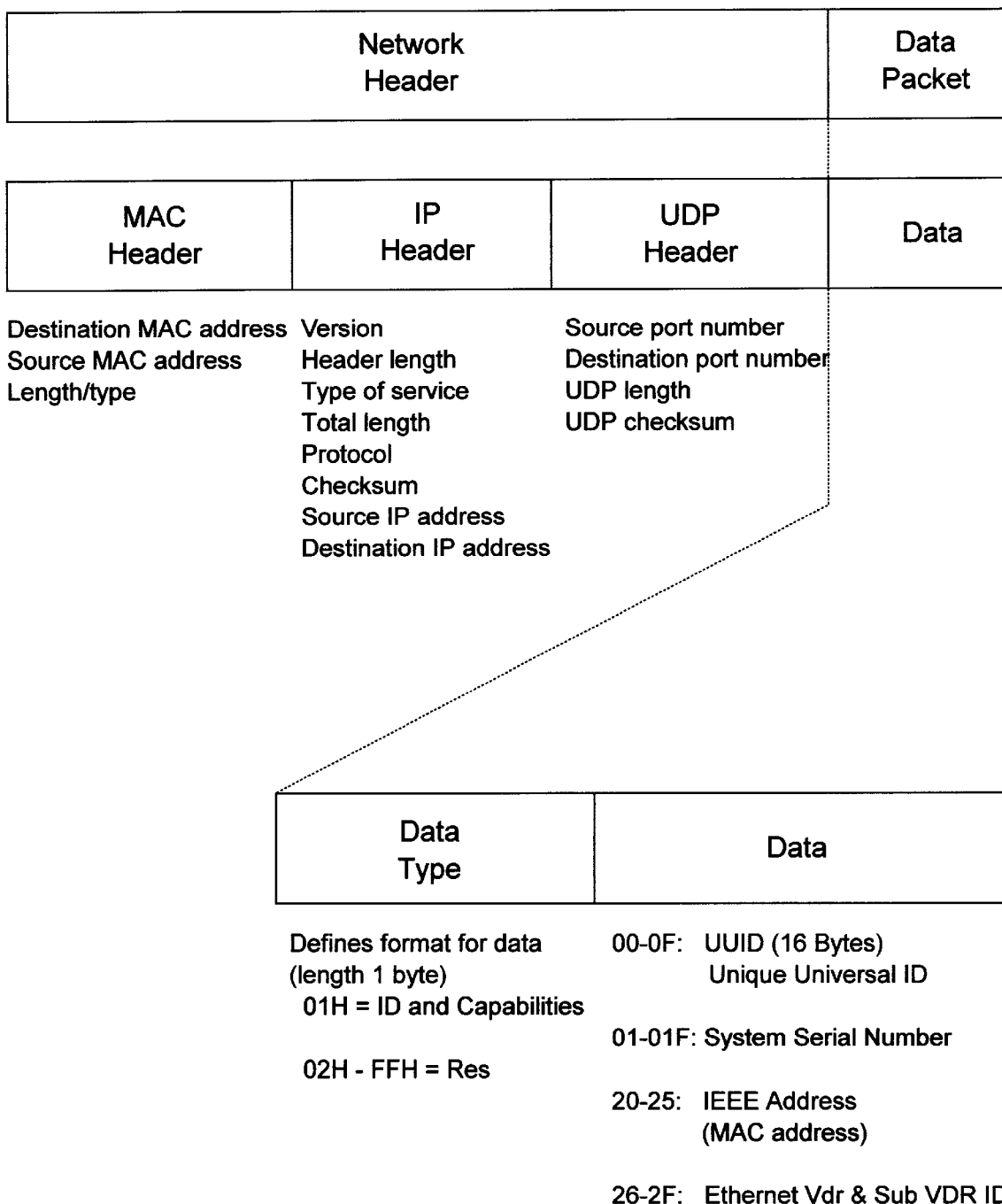
FIG. 6 is a diagrammatic representation of a packet which is sent by the personal computer of FIG. 3 in accordance with the present invention.

A packet including a network header and data packet that can be sent over an Ethernet network is indicated in FIG. 6. The network header includes a MAC header, an IP header and UDP header as is known to provide addresses, identifiers and other information for assuring correct transfer. The data packet includes the information for main computer 102 to identify system 12 and provide capabilities of computer system 12. For the transmission packets created by ASIC 114 and asserted at the MII bus 97 (FIG. 5), the data type and data patterns indicated for transmission in FIG. 6 are preferably followed according to the invention.

Referring to FIG. 6, the data type is first used to set up a category of data and then a data portion provides specific information. The data type for this invention indicates a transmission of system identification and capabilities. The data patterns defined are the (1) Universal Unique ID (UUID) which is used by main computer 102 to reference computer system 12, (2) serial number of system 12 which is used by main computer 102 to determine the model of computer system 12, (3) IEEE Address which is assigned by IEEE to uniquely identify computer 12 on a network, and (4) Ethernet Vendor which identifies the vendor of the Ethernet LAN subsystem 94 in system 12 used by the main computer 102 to select the correct device driver. It should be understood that the data packet and data patterns shown in FIG. 6 are by way of example only, and other packets and patterns can be used with the present invention.

Figure 7:
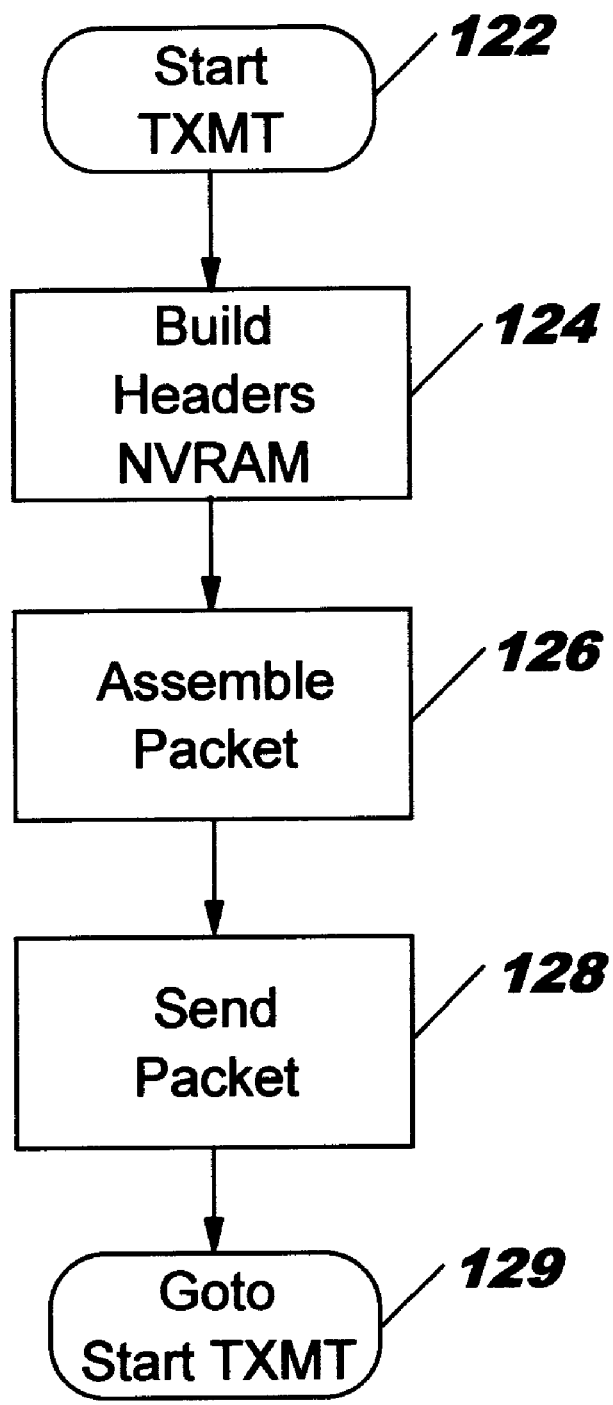
FIG. 7 is a flow chart describing logic for generating the data packet of FIG. 6 in accordance with the present invention.

Referring to FIG. 7, a flow chart is shown which describes the logic steps used to prepare and send packets for transmission over the network according to the present invention. A logic state of "1" on XMT signal 112 from logic 103 results in microcontroller 118 beginning at step 122. Next, at step 124, the logic 114 builds headers as described at FIG. 6 using data stored in the nonvolatile memory 120. The packet is assembled at step 126 and transmitted to remote or main computer 102 at step 128. Next, execution proceeds to step 129 where the microcontroller 118 returns to step 122 to build the next packet.

Figure 8:
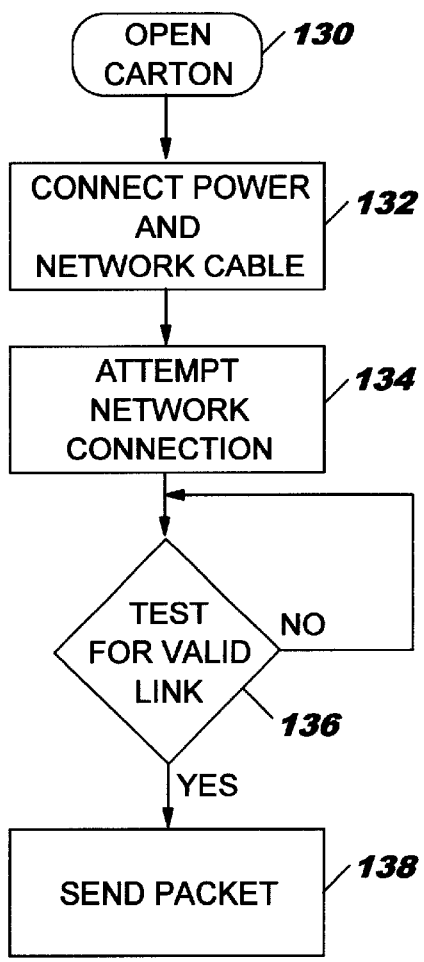
FIG. 8 is s flow chart of the steps utilized to allow the personal computer of FIG. 2 to transmit the data packet of FIG. 6 over the network in accordance with the present invention.

Referring now to FIG. 8, there is shown a flow chart describing the steps needed to transmit the packet of FIG. 6 from computer system 12 to main computer 102 in accordance with the present invention. First, the connectors 16 and 18 (FIG. 1) are accessed by an operator through the shipping package 10 by removing the flap 28 of carton 10 (step 130). Next, power is applied by plugging power cord 108 into connector 16 and the network cable 100 is connected by placing connector 104 into the socket of network connector 18 (step 132). Once power is applied, the AUX signal 107 from the power supply 34 will change to a logic "1" state. Next, the physical layer 98 will attempt to establish a link to main computer 102 (step 134). If a valid link connection is achieved, the physical layer 98 will activate the LINK signal 114 (logic "0"). Next, the system will check for a valid network connection (i.e., check whether the LINK signal is a active or inactive) at step 136. The system 12 will remain at step 136 until a valid connection is established.

Once a link is established, the logic 103 will drive the XMT signal 112 to a logic "1" state since the AUX signal 107 is active (logic "1") and the LINK signal 110 is also active (logic "0"). Next, the ASIC 114 will detect the active XMT signal 112 and transmit a packet which contains the capabilities and identification of computer system 12 to main computer 102 using the physical layer 98 of LAN subsystem 94 as described above (step 138). It should be noted the steps of FIG. 8 are carried out without system 12 being powered on.

After the main computer 102 receives the packet which includes the MAC address, device driver information and serial number for system 12, a network administrator can check to see if system 12 is a known system. If system 12 is unknown, the system administrator can assign a default image or remove the system 12 from the configuration center. If system 12 is a known system, then the network administrator can build an image for system 12 using its serial number, add its capabilities, device driver type and records the MAC address.

Figure 9:
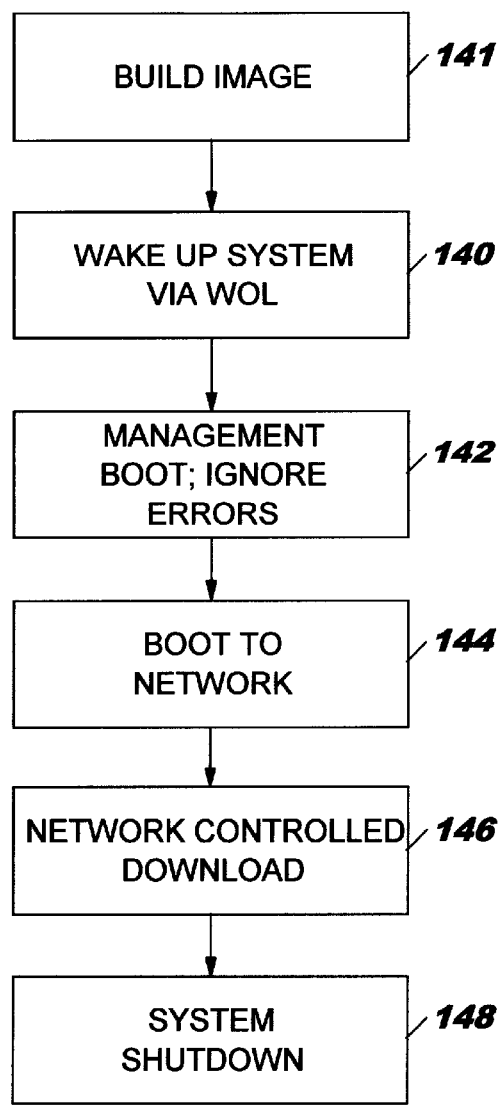
FIG. 9 is s flow chart describing logic to place a custom image on the hard drive of the personal computer of FIG. 2 in accordance with the present invention.

Once the custom image is prepared, it can be transferred from main computer 102 to system 12. More specifically, referring now to FIG. 9, there is shown a flow chart describing the steps needed to place a custom image on the hard drive of the computer system 12 in accordance with the present invention. After the main computer 102 builds the custom image (step 141) using the data received from the packet of FIG. 6, the main computer 102 will power on system 12 by sending a WOL packet (step 140).

Once the system is energized wake up begins. As is well known, system BIOS logic stored, for example, in flash memory 78, starts wake up and runs a self test to determine if devices are operative. For example, mouse or keyboard or display as would in a full system be connected at connectors 24, 22 or 20 are checked. If absent an error condition is ignored (142). The system 12 then boots to the network to download an image (144). When system 12 is connected to computer 102 via link 100 according to the present invention, the system 12 can receive data and boot instructions downloaded from the server 102. Once the system 12 receives boot instructions to memory 62 it operates as if under a normal boot process but with the network connection as the boot instruction source. Once the system 12 is at a level of expanded operational capability as a result of the downloaded instruction, the server 102 proceeds with the download of data (step 146) such as configuration and application programs to the respective media such as flash memory 78, hard drive 52 and floppy disk drive 48. After all configuration data, operating system code and application code is downloaded, the server 102 commands a shut down (step 148) and the connections at connectors 16 and 18 are removed to complete the configuration process.

In this way the computer system 12 may be configured in the shipping box 10 providing convenience and savings over full set-up at a configuration station or at the user site.

As noted above, the LAN subsystem 94 is powered by auxiliary voltage (e.g., AUX 107) which is present so long as the system 12 is connected to AC power. Accordingly, the LAN subsystem 94 will negotiate for a connection by sending and responding to packets sent over cable 100 when the system 12 is in any power state (normal operating, suspend, off, etc.). This allows the system 12 to negotiate for link regardless of power state. This has the advantage that the present invention does not require the system 12 to be powered to a normal operating or ON state to operate.

The present invention provides several advantages for a configuration process. Namely, the system 12 is configured to automatically transmit its identity and capabilities to a main computer 102 to facilitate configuring system 12 in its shipping package 12 without a need for operator intervention. The automatic transmission will supply system attributes required for configuration and eliminate the potential for operator error when retrieving information from the system to be configured. With this abnormal operating environment and operation the system 12 is placed in condition to be removed from the packaging at the user's location with BIOS and program image customized for the user. This approach provides a freshly configured system and yet eliminates unpacking at a configuration center and then repacking for transfer to the user or the need for refresh configuration at the user site as the system unit is set up for normal use.

While the invention has been particularly shown and described with respect to preferred embodiments thereof, it should be understood by those skilled in the art that the foregoing and other changes in form and detail may be made therein without departing from the spirit and scope of the invention as defined in the appended claims.

What is claimed is:

1. A computer system which is operable to be automatically configured in its enclosing shipping package, said system being coupled to a remote computer via a data communication link, said system being adapted to transfer data over said communication link for establishing connection external of said packaging, and comprising:

a memory for storing data, a communication subsystem for communicating data with said computer system, said communication subsystem being supplied with auxiliary power and being operative to communicate with said computer system regardless of whether said computer system is in a normal operating state, said communication subsystem being operative to generate a link signal in a first state when a valid communication link is established with said remote computer and wherein said subsystem is operative to change said link signal from said first state to a second state when said data communication link is disconnected, and a first logic circuit coupled to said communication subsystem, said first logic circuit being supplied with auxiliary power and being operative to generate a transfer signal to a second logic circuit when said link signal is in said first state and an auxiliary power signal is in a first state, wherein said second logic circuit is operative to receive said transfer signal and assemble a first packet having said identification and capability information of said computer system and automatically send said first packet to said remote computer via said communication subsystem wherein said first packet comprising data which specifically identifies said computer system, wherein when said communication link is coupled to said communication subsystem through said packaging and a power source is coupled to a power connector of said system through said packaging, said system is operative to send said first packet without powering on, and wherein said computer system is operative to automatically transmit said identification and capability information to a network administrator.

2. The computer system of claim 1, wherein said remote computer is operative to receive said first packet and respond by sending a wake up packet to said system, and wherein said system is operative to receive said packet, power on and receive (1) signals from said remote computer via said communication link to set up data transfers to the memory of said system, and (2) data from said remote computer which is stored in the memory of said system, whereby said system is configured at least in part in its packaging.

3. The computer system of claim 1, wherein said system logic circuit includes:

a first logic circuit supplied with said auxiliary power and operative to generate a transfer signal to a second logic circuit when said link signal is in a first state and an auxiliary power signal is in a first state, and wherein said second logic circuit is operative to receive said transfer signal and assemble said first packet with identification and capability information of said computer system and transmit said first packet via said communication subsystem.

4. The computer system of claim 3, wherein said second logic circuit includes a microcontroller for assembling said first packet, an interface for communicating with said communication subsystem, and a memory for storing data which identifies and provides capabilities of the computer system, said microcontroller being operative to receive said transfer signal and in response thereto assemble said first packet.

5. The computer system of claim 4, wherein said communication subsystem includes a MAC coupled to a physical layer via a MII bus, and a connector coupled to said physical layer and said communication link, said physical layer being operative to generate said link signal.

6. The computer system of claim 2, wherein said system is of a type that normally boots from a storage medium and sets, using self test logic an error condition if predefined input devices are not connected at connection ports of the system and wherein said computer system is operative to ignore said error condition after said communication link is coupled to said communication subsystem through said packaging and said power source is coupled to said power connector of said system through said packaging.

7. The computer system of claim 1, wherein said communication subsystem is a LAN adapter card.

8. The computer system of claim 1, wherein said communication subsystem is a LAN connection embedded on a planar of said computer system.

9. A computer system which is operable to be automatically configured in its enclosing shipping package, said system being coupled to a remote computer via a data communication link, said system being adapted to transfer data over said communication link for establishing connection external of said packaging, and comprising:

a memory for storing data, a communication subsystem for communicating data with said computer system, said communication subsystem being supplied with auxiliary power and being operative to communicate with said computer system regardless of whether said computer system is in a normal operating state, said communication subsystem being operative to detect when a valid communication link is established between said computer system and said remote computer and after said detection said communication subsystem assembles a first packet with identification and capability information of said computer system and automatically sends said first packet to said remote computer via said communication subsystem, said first packet comprising data which specifically identifies said computer system,] and wherein when said communication link is coupled to said communication subsystem through said packaging and a power source is coupled to a power connector of said system through said packaging, said system is operative to send said first packet without powering on, and wherein said computer system is operative to automatically transmit said identification and capability information to a network administrator.

10. The computer system of claim 9, wherein said remote computer is operative to receive said first packet and respond by sending a wake up packet to said system, and wherein said system is operative to receive said packet, power on and receive (1) signals from said remote computer via said communication link to set up data transfers to the memory of said system, and (2) data from said remote computer which is stored in the memory of said system, whereby said system is configured at least in part in its packaging.

11. The computer system of claim 9, wherein said communication subsystem includes:

a first logic circuit supplied with said auxiliary power and operative to generate a transfer signal to a second logic circuit when said link signal is in a first state and an auxiliary power signal is in a first state, and wherein said second logic circuit is operative to receive said transfer signal and assemble said first packet with identification and capability information of said computer system and transmit said first packet via said communication subsystem.

12. The computer system of claim 11, wherein said second logic circuit includes a microcontroller for assembling said first packet, an interface for communicating with said communication subsystem, and a memory for storing data which identifies and provides capabilities of the computer system, said microcontroller being operative to receive said transfer signal and in response thereto assemble said first packet.

13. The computer system of claim 12, wherein said communication subsystem includes a MAC coupled to a physical layer via a MII bus, and a connector coupled to said physical layer and said communication link, said physical layer being operative to generate said link signal.

14. The computer system of claim 9, wherein said communication subsystem is a LAN adapter card.

15. The computer system of claim 9, wherein said communication subsystem is a LAN connection embedded on a planar of said computer system.

* * * * *